United States Patent [19]

Bush

[11] 4,289,667

[45] Sep. 15, 1981

[54] EMULSION POLYMERIZATION PROCESS WITH LOW EMULSIFIER CONCENTRATION

[75] Inventor: Charles N. Bush, Bay Village, Ohio

[73] Assignee: The B. F. Goodrich Company, Akron, Ohio

[21] Appl. No.: 113,840

[22] Filed: Jan. 21, 1980

[51] Int. Cl.$^3$ ............................ C08F 2/18; C08F 2/20
[52] U.S. Cl. ......................... 260/23 XA; 260/23 EP; 260/23 EM; 260/31.8 R; 260/31.8 G; 260/34.2; 526/74
[58] Field of Search ...... 526/74; 260/23 XA, 23 EM, 260/23 EP, 31.8 R, 34.2, 31.8 G

[56] References Cited

U.S. PATENT DOCUMENTS

| | | |
|---|---|---|
| 3,867,331 | 2/1975 | Mikofalvy et al. ............ 260/31.8 R |
| 4,076,920 | 2/1978 | Mikofalvy et al. ................... 526/74 |
| 4,085,267 | 4/1978 | Morningstar et al. ................ 526/74 |
| 4,113,687 | 9/1978 | Ugelstad .................... 260/29.6 XA |
| 4,186,259 | 1/1980 | Bush et al. ............................ 526/74 |
| 4,203,879 | 5/1980 | DeWald et al. ............... 260/23 XA |

FOREIGN PATENT DOCUMENTS 48-4589  1/1973  Japan ..................................... 526/74

*Primary Examiner*—Ronald W. Griffin
*Attorney, Agent, or Firm*—Roy P. Wymbs

[57] ABSTRACT

There is disclosed a process for producing vinyl dispersion resins by means of the emulsion polymerization technique. The vinyl monomer or monomers are reacted in an aqueous medium using a water-insoluble free radical yielding catalyst, an emulsifier or emulsifier system and a small amount of water-insoluble plasticizer whereby the amount of emulsifier(s) necessary is greatly reduced. All the reaction ingredients are thoroughly mixed and homogenized prior to polymerization at a temperature of about 30° C. to about 70° C. The paste resins so produced have improved properties, such as foam properties, and polymer buildup in the reactor is reduced.

19 Claims, No Drawings

EMULSION POLYMERIZATION PROCESS WITH LOW EMULSIFIER CONCENTRATION

BACKGROUND OF THE INVENTION

In the customary emulsion polymerization process, suitable latices have been difficult to obtain since the latices usually contain particles of varying size and are either too fine or too large. In addition to particle size uniformity, other properties of the resins produced by emulsion polymerization need to be improved such as plastisol viscosity, clarity, gel temperature, as well as bloom and bleed properties in products made therefrom. Various proposals have heretofore been made to improve these properties with some success but not with the ultimate success desired. For example, the use of various different emulsifiers and catalysts have been proposed. Also, varying the conditions of polymerization has been suggested. However, in most of these cases, too much coagulation occurred with the resulting latex containing too much coagulum or partially agglomerated particles which precipitate reducing the yield. Further, the shelf-life of such latices leave much to be desired. It is desirable to have latices which change very little during storage with respect to viscosity and have and maintain good heat stability.

One of the major difficulties in producing vinyl dispersion resins or polymers by means of the emulsion polymerization technique is the large amounts of emulsifier or soap that must be employed. These high levels not only lead to high raw material costs but more importantly, put limits on the desirable resin properties which one can attain with the emulsion polymerization procedure. A reduction in the amount of emulsifier or soap needed in the polymerization recipe would be most desirable.

Another detrimental problem in the commercial production of polymers and copolymers of vinyl and vinylidene halides, when polymerized alone or with other copolymerizable monoolefinic monomers having a terminal $CH_2=C<$ group, is the formation of undesirable polymer buildup on the inner surfaces of the reactor. This buildup is particularly bad when large amounts of emulsifier are employed. This deposit or buildup of polymer on said reactor surfaces not only interferes with heat transfer, but also decreases productivity and adversely affects polymer quality, such as producing finer particles than desired with the resultant adverse effect on viscosity. Obviously, this polymer buildup must be removed and the removal thereof is difficult and time consuming. It would be most desirable, of course, to have a polymerization process in which polymer buildup does not occur or in which the polymer buildup is reduced to a minimum and which buildup is of the "sandy" or easy to remove type.

SUMMARY OF THE INVENTION

It has unexpectedly been found that in the emulsion polymerization of vinyl monomers, when making vinyl dispersion polymers and copolymers, a substantial reduction in the amount of emulsifier(s) needed can be achieved by adding a small amount of a water-insoluble plasticizer to the polymerization recipe. It has been further found that by using water-insoluble initiators and homogenizing the entire reaction mixture, prior to polymerization, the foam properties of plastisols made from the polymers are greatly enhanced. The plasticizer adds to the stability of the monomer droplets in the premixing and homogenizing stages thus allowing a reduction in emulsifier without degrading the overall polymerization colloidal stability. The reduction in emulsifier concentration results in a substantial reduction in polymer buildup during polymerization.

DETAILED DESCRIPTION

In the present invention, "vinyl dispersion resin" refers to polymers and copolymers of vinyl and vinylidene halides, such as vinyl chloride, vinylidene chloride, and the like. The vinyl halides and vinylidene halides may be copolymerized with one or more polymerizable olefinic monomers having at least one terminal $CH_2=C<$ grouping. As examples of such olefinic monomers may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives, such as $\alpha$-methyl styrene, vinyl toluene, chlorostyrene, and the like; vinyl naphthalene, allyl and vinyl chloroacetate, vinyl acetate, vinyl pyridine, methyl vinyl ketone, and other polymerizable olefinic monomers of the types known to those skilled in the art. The present invention is particularly applicable to the manufacture of vinyl dispersion resins or pastes made by the polymerization of vinyl chloride or vinylidene chloride alone or in admixture with one or more olefinic monomers copolymerizable therewith in amounts up to about 80% by weight, based on the total weight of the monomers. The most preferred vinyl dispersion resin is polyvinyl chloride (PVC) and the invention, for simplicity and convenience, will be described in connection therewith, it being understood that this is merely intended in an illustrative sense and not limitative.

It is to be noted that it has heretofore been proposed to polymerize vinyl monomers in the presence of a plasticizer. See, for example, U.S. Pat. No. 3,867,331, issued Feb. 18, 1975. In this patent an emulsion polymerization process is employed wherein the recipe contains a plasticizer. However, in said patent the purpose is to get as much plasticizer in the finished resin as possible, which is not the purpose of the present invention. In said patent from 5 to 100 parts by weight of plasticizer are employed, and preferably from 15 to 90 parts, which is far beyond the amount employed herein, as will be seen from the discussion hereinafter. No mention is made by the patentees that the plasticizer is used to reduce the amount of emulsifier employed. In fact, just the opposite must be inferred, since the amount of emulsifier employed in the patent is much higher than that employed herein.

In U.S. Pat. No. 4,113,687, issued Sept. 12, 1978, an emulsion polymerization process is described wherein the recipe contains a solvent for the monomer. The patent also uses a water-soluble initiator whereas in the present invention a water-insoluble initiator is employed. Further, in the patent a portion of the water plus emulsifier plus the monomer-dissolving substance (solvent) are homogenized to form an emulsion. Then the rest of the water plus the monomer or monomer mixture plus the water-soluble initiator are added to the emulsion with ordinary stirring. In the present invention the entire reaction mixture is homogenized together and passed to the reactor.

The important aspect of the present invention is the use in the polymerization recipe of a small amount of water-insoluble plasticizer which allows a reduction of up to about 50% or more in the amount of emulsifier or soap needed in the polymerization recipe. As examples of the water-insoluble plasticizers, there may be named dioctyl adipate, epoxidized soybean oil, dioctyl phthalate, dioctyl azelate, dicapryl adipate, diisodecyl phthalate, isopropyl myristate, isopropyl palmitate, n-heptyl-n-octyl adipate, and the like. The amount of plasticizer employed is small and generally will be in the range of about 0.05% to about 4.5% by weight, based on the weight of the monomer or monomers being polymerized. Preferably, the amount of plasticizer will be in the range of about 0.1% to about 1.0% by weight. The plasticizer is charged to the premix prior to homogenization along with the other ingredients in usual fashion, with no particular or extraordinary technique being required.

When making vinyl dispersion resins, wherein the aqueous emulsion polymerization technique is employed, the aqueous reaction medium will contain one or more emulsifiers or an emulsifier system, such as a salt of a long chain fatty acid and a long straight chain saturated alcohol. In order to get the proper and improved properties in films made from the vinyl dispersion resin, such as, for example, improved water resistance, heat stability, and the like, an alkali metal or ammonium salt of a long chain saturated fatty acid is used as emulsifier or as part of the emulsifier system. The saturated fatty acids referred to may be either natural or synthetic and should contain from 8 to 20 carbon atoms. As examples of such acids there may be named lauric, myristic, palmitic, marganic, stearic, and the like, beef tallow, coconut oil, and the like. Excellent results have also been obtained when anionic emulsifiers are used, such as the alkali metal or ammonium salts of the sulfates of alcohols having from 8 to 18 carbon atoms. As examples of such emulsifiers there may be named sodium lauryl sulfate, ethanolamine lauryl sulfate, ethylamine lauryl sulfate, and the like, alkali metal and ammonium salts of sulfonated petroleum and paraffin oils; sodium salts of hydrocarbon sulfonic acids, such as dodecane-1-sulfonic acid and octadiene-1-sulfonic acid; sodium salts of alpha-olefin sulfonates; aralkyl sulfonates, such as sodium isopropyl benzene sulfonate, sodium dodecyl benzene sulfonate, sodium isobutyl naphthalene sulfonate, and the like; alkali metal and ammonium salts of sulfonate, and the like; alkali metal and ammonium salts of sulfonate dicarboxylic acid esters, such as sodium dioctyl sulfosuccinate disodium-n-octadecyl sulfosuccinate, and the like; alkali metal and ammonium salts of free acid of complex organic mono- and di-phosphate esters and the like. Nonionic emulsifiers, such as octyl- or nonylphenyl polyethoxyethanol, may also be used. Vinyl polymer latices having excellent stability are obtained when employing the alkali metal and ammonium salts of aromatic sulfonic acid, aralkyl sulfonates and long chain sulfonates. The emulsifier, when using the plasticizer, in accordance with the present invention, is employed in an amount in the range of about 0.4% to about 4.0% by weight based on the weight of the monomer or monomers being polymerized. Preferably, the emulsifier is used in an amount in the range of about 0.6% to about 1.2% by weight. When using more than one emulsifier in the system, the combined weight will be in the same range.

In addition to the compounds named above, in many instances in order to obtain certain desirable vinyl dispersion resin properties, a long straight chain saturated alcohol containing from 8 to 24 carbon atoms is employed in the emulsifier system. The addition of the alcohol to the system increases the colloidal stability of the polymerization system. Further, the presence of the alcohol reduces the amount of polymer buildup and coagulum. As examples of such alcohols there may be named octanol, monanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, etc. Mixtures of the alcohols can also be employed. For example, a 12 carbon alcohol and an 18 carbon alcohol can be used. Also, lower carbon content alcohols can be employed when mixed with the longer chain length alcohols. For example, a mixture of dodecanol and octadecanol. Further, ethoxylated alcohols can be used, such as a mixture of ethoxylated linear primary alcohols containing from 12 to 15 carbon atoms, etc. In U.S. Pat. No. 4,076,920, issued Feb. 28, 1978, there is shown the use of said alcohols with the emulsifier compounds in the emulsifier system. However, in said patent the emulsifier is limited to the ammonium salt of the fatty acid and the ratio of alcohol to fatty acid salt can be 1.0 but preferably the ratio is greater than 1.0. In the present invention, on the other hand, when an alcohol is used, said ratio of alcohol to emulsifier is less than 1.0 and preferably in the range of about 0.15 to about 0.75.

In the emulsion polymerization process of the present invention, the same is conducted at a high pH. The process can be conducted at a pH in the range of about 2.0 to about 10.5. If the pH is too high it takes too much alkali and if the pH is too low, for example, below 5.0, the coagulum increases. The amount of alkaline agent needed to properly adjust and maintain the proper pH will depend in part on the particular emulsifier system being used in the reaction mixture.

As in all vinyl polymerization processes, the instant process is conducted in the presence of a compound capable of initiating the polymerization reaction. Free radical yielding initiators, normally used for polymerizing olefinically unsaturated monomers, are satisfactory for use in the present process. However, it is most important that the initiator be water-in-soluble. The usual initiators or catalysts include, for example, the various peroxygen compounds, such as lauryl peroxide, isopropyl peroxydicarbonate, bis(4-tertbutyl cyclohexyl) peroxydicarbonate, di(2-ethyl hexyl) peroxydicarbonate, diisononanoyl peroxide, benzoyl peroxide, t-butyl hydroperoxide, t-butyl peroxypivalate, cumene hydroperoxide, t-butyl diperphthalate, pelargonyl peroxide, 1-hydroxy cyclohexyl hydroperoxide, tert-butyl peroxyneodecanoate, and the like; azo compounds, such as azodiisobutyronitrile, dimethylazodiisobutyrate, and the like. The amount of initiator used will generally be in the range of about 0.01% to about 0.5% by weight, based on the weight of 100 parts of monomer or monomers being polymerized, and preferably between about 0.015% and 0.15% by weight.

The initiator is charged completely at the outset of the polymerization. When the initiator is charged at the outset it is added to the monomer premix with the other ingredients of the reaction mixture. This is particularly true when said premix is homogenized prior to introduction into the reactor. However, when adding the initiator to the premix and then homogenizing, it is necessary that the temperature during the premixing and homogenization steps be kept below the minimum temperature of reactivity of the particular initiator or initiators being employed. For example, when making a premix of vinyl chloride, water, plasticizer and suitable emulsifiers and then adding isopropyl peroxydicarbonate thereto, the temperature is maintained at 20° C. during the mixing step and then during the homogenization step. Upon introduction of the homogenized mixture into the polymerization reactor, the temperature is then raised to that at which the reaction is to take place.

An important aspect of the present invention is that the monomer premix should be thoroughly mixed prior to introduction into the reactor. The mixing is usually done in a separate vessel, or premix tank. When the catalyst is added at the beginning of the reaction, it is the last ingredient added to the premix. Also, since the catalyst being employed is not water-soluble, it should be added to the premix in a suitable solvent therefor which will insure emulsification in the premix and even distribution therein. Needless to say, any such solvent should be inert to the reaction ingredients and reaction conditions. For example, when employing isopropyl peroxydicarbonate as the catalyst or initiator, it is dissolved in hexane and then added to the premix.

After the monomer premix, or reaction premix, is thoroughly mixed, it is thereafter subjected to homogenization prior to entering the polymerization step or reactor. It is most important in the present invention that all of the ingredients of the polymerization recipe be homogenized together at the same time. Any convenient means of homogenizing may be employed. It has been found that either a one stage or a two stage Manton-Gaulin homogenizer is a convenient apparatus for homogenizing the premixes contemplated by the present invention. The premix leaves the homogenizer and goes directly into the reaction vessel which preferably contains an inert atmosphere, such as nitrogen.

The homogenization step is important since it assures the proper particle size of the polymer in the finished latex. A particle size in the range of about 0.1 to about 10.0 microns is desirable, with most of the particles being about 2 microns in size. When the polymer particles are of the proper size, it assues good properties in the plastisols made therefrom.

The temperature at which the polymerization reaction is conducted is important since the inherent viscosity (IV) of the plastisols made with the vinyl dispersion resins thus produced is a direct function of the temperature of reaction. That is, the higher the temperature the lower the IV. Accordingly, the end use for the vinyl dispersion resin to be produced will normally dictate the polymerization reaction temperature. For example, when producing vinyl dispersion resins for use in coatings or in casting flexible films, a lower temperature of reaction will be employed in order to attain a higher IV which is desirable for many coating applications. It has been found that for the end uses to which the vinyl dispersion resins are particularly adapted, polymerization temperatures in the range of about 30° C. to about 70° C. are satisfactory. Preferably, however, a temperature in the range of about 40° C. to about 55° C. will be employed. It should be noted that, in general, as the temperature of reaction is increased, the polymer buildup on the inner surfaces of the reactor increases. However, when practicing the present invention, the polymer buildup is substantially reduced. This is due to the big reduction in the amount of emulsifier employed which in turn is due to the small amount of plasticizer present in the reaction mixture. The small amount of polymer buildup that does form is not of the hard crusty type and can readily be removed by rinsing or hosing down with water and without opening the reactor when appropriate spray nozzles are installed in the reactor. After the polymerization reaction is complete, the vinyl dispersion resin is isolated in powder form from the latex by means of spray drying. That is, a fine spray of the polymer latex is injected into a heated air chamber thereby removing the water and recovering the dried resin in powder form.

Plastisols are made with the vinyl dispersion resins of the present invention by uniformly blending or intimately mixing, by conventional means, with 100 parts by weight of the dispersion resin in powder form from about 30 to about 100 parts by weight of one or more plasticizers. The useful plasticizers for this purpose may be described as the alkyl and alkoxy alkyl esters of dicarboxylic acids or the esters of a polyhydric alcohol and monobasic acid. As examples of such materials, there may be named dibutyl phthalate, dioctyl phthalate, dibutyl sebacate, dinonyl phthalate, di(2-ethylhexyl) phthalate, di(2-ethylhexyl) adipate, dilauryl phthalate, dimethyl tetra-chlorophthalate, butyl phthalyl butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

The plastisols made from the vinyl dispersion resins should have the desired yield. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D1824-61T. Yield is determined from viscosity measurements of the plastisols at varying r.p.m.'s (revolutions per minute) after initial preparation and intervals of aging. The viscosity is measured in centipoises (cps) at a temperature of 23° C. In the specific examples that follow hereinafter, viscosity measurements were made at 2 rpm. and 20 rpm. and are expressed as $V_2$ and $V_{20'}$, respectively.

To further illustrate the present invention, the following specific examples are given, it being understood that this is merely intended in an illustrative and not a limitative sense. In the examples all parts and percents are by weight unless otherwise indicated.

EXAMPLE I

In this example several runs were made using different plasticizers, as shown in the Table that follows below. In the runs the following recipe was used, the amount of plasticizer being shown in the Table:

|  | Parts |
|---|---|
| Vinyl Chloride | 100 |
| Water (demineralized) | 140 |
| Alpha olefin sulfonate | 0.9 |

-continued

| | Parts |
|---|---|
| Alcohol ($C_{12}$ + $C_{18}$) | 0.25 |
| Diiosononanoyl peroxide | 0.05 |
| Di-(2-ethyl-hexyl) Peroxydicarbonate | 0.04 |

All of the ingredients, including the plasticizer, were charged to a premix tank with the vinyl chloride being charged last after the tank had been placed under vacuum. The mixture was then stirred or agitated for 15 minutes at a temperature of 20° C. Then the premix was homogenized in a two stage Manton-Gaulin Model L-100 homogenizer at a temperature of 20° C. into the polymerization reactor. The first stage of the homogenizer was set at 700 psig. and the second stage at 600 psig. The reactor was evacuated prior to the addition of the homogenized premix. The reactor was heated to the reaction temperature of 45° C. and the reaction conducted with stirring until completion. The polymer latex or slurry was removed from the reactor and spray-dried to recover the dry PVC or resin.

Plastisols were made with the polymer from each run for evaluation purposes. The plastisol recipe used, in each case, was as follows:

| | Parts |
|---|---|
| PVC (polyvinyl chloride) | 100 |
| Dioctyl Phthalate | 57 |
| Epoxidized soybean oil | 3 |
| Barium-zinc stabilizer | 2 |

Pertinent data with respect to the polymerization and the plastisol properties are given in the following table:

TABLE I

| Run No. | Control (b) | 1 | 2 | 3 | 4 | 5 | 6(a) |
|---|---|---|---|---|---|---|---|
| Plasticizer (parts) | | | | | | | |
| Dioctyl adipate | | 0.25 | | | | | |
| Epoxidized soybean oil | | | | | | | |
| Diisodecyl phthalate | | | 0.25 | | | | |
| Ditridecyl phthalate | | | | 0.25 | | | |
| Dioctyl phthalate | | | | | 0.25 | | |
| Dioctyl Azelate | | | | | | 0.25 | |
| n-hexyl-n-nonyl adipate | | | | | | | 0.25 |
| Reaction time (hours) | 18 | 13 | 12 | 12 | 13.5 | 13 | 10 |
| Coagulum (Percent) | 0.14 | 0.16 | 0.07 | 0.16 | 0.12 | 0.22 | 0.14 |
| Slurry | | | | | | | |
| Total solids (percent) | 36 | 34.5 | 34.5 | 37 | 37 | 37.5 | 35.5 |
| Sedimentation (1 day) (%) | — | 2 | 2 | 5 | 5 | 4 | 5 |
| Surface Tension | — | 45.1 | 48.0 | 48.5 | 38.5 | 49.0 | 46.2 |
| pH | 3.3 | 6.9 | 7.4 | 7.4 | 7.5 | 9.9 | 7.7 |
| Plastisol | | | | | | | |
| Brookfield Viscosity | | | | | | | |
| 1 day $V_2$ | 32,500 | 155,000 | 340,000 | 290,000 | 37,000 | 62,500 | 270,000 |
| $V_{20}$ | 14,000 | 39,750 | 59,000 | 50,000 | 13,000 | 17,500 | 56,000 |
| 7 day $V_2$ | 52,500 | 260,000 | 420,000 | 370,000 | 50,000 | 80,000 | 290,000 |
| $V_{20}$ | 19,500 | 55,000 | 72,000 | 67,000 | 16,750 | 27,000 | 69,000 |
| Severs Efflux (95 psi, 0.165 cm. orifice, 100 sec.,gr.) | 11.9 | 11.5 | 15.6 | 13.9 | 11.5 | 13.5 | 11.0 |
| Heat Stability (minutes at 375° F.) | | | | | | | |
| Yellow | 25 | 30 | 35 | 40 | 30 | 30 | 25 |
| Brown/Black | 35 | 40 | 55 | 55 | 45 | 45 | 35 |

(a) Used 0.9 part sodium lauryl sulfate and NaOA in place of alpha olefin sulfonate.
(b) Used 0.26 part of each of 2 catalysts (peroxide and peroxydicarbonate).

It can be seen from the above data that most all of the properties are comparable to previous dispersion resins but with greatly reduced amounts of emulsifier. Further, the heat stability is enhanced by use of the present invention.

EXAMPLE II

In this Example, three additional runs were made to show improved resin properties. The same procedure, as shown in Example I, was employed in these runs. The recipes and properties are shown in the following table:

TABLE II

| Run No. | Control | 7 | 8 | 9 |
|---|---|---|---|---|
| RECIPE (in parts) | | | | |
| Vinyl chloride | 100 | 100 | 100 | 100 |
| Water (demineralized) | 140 | 140 | 140 | 140 |
| Sodium lauryl sulfate | 0.9 | 0.9 | 0.9 | — |
| Sodium alpha olefin sulfonate | — | — | — | 0.9 |
| Alcohol ($C_{12}$ + $C_{18}$) | 2.1 | 0.5 | 0.5 | 0.5 |
| Dioctyl adipate | — | 0.5 | — | 0.5 |
| Expoxidized soybean oil | — | — | 0.5 | — |
| Diisononanoyl peroxide | 0.05 | 0.05 | 0.05 | — |
| Di-(2-ethyl-hexyl) peroxydicarbonate | 0.04 | 0.04 | 0.04 | — |
| di(tert-butylcydohexyl) peroxydicarbonate | — | — | — | 0.08 |

TABLE II-continued

| POLYMERIZATION | | | | |
|---|---|---|---|---|
| % Coagulum | 0.04 | 0.80 | 0.04 | 0.09 |
| % Total solids | 36 | 33 | 38 | 42 |
| | Control | 8 | 9 | 10 |
| SLURRY SEDIMENTATION (%) | | | | |
| 1 Day | 1 | 1 | 1 | 1 |
| 7 Days | 5 | 4 | 4 | 3 |
| PLASTISOL[1] | | | | |
| Brookfield Viscosity(cps) | | | | |
| 1 Day $V_2$ | 52500 | 16000 | 52500 | 35000 |
| $V_{20}$ | 23200 | 11000 | 22000 | 13250 |
| SEVERS EFFLUX (95 psi, 0.165 cm. orifice, 100 sec.gr) | | | | |
| 1 Day | 8.0 | 6.7 | 11.9 | 13.1 |
| AIR RELEASE (Sec.) | | | | |
| 0.5cc. bubble | 180 | 6 | 180 | 180 |
| Wet Gel | 165° F. | 170° F. | 170° F. | 160° F. |
| Clarity (% light passing through 20 mil. film) | 73 | 70 | 70 | 79 |

[1] Recipe same as Example I

From the above results the improvement in properties are apparent, particularly in Brookfield viscosity and Severs efflux. The improvement in clarity and gel temperature is particularly evident in Run No. 10.

EXAMPLE III

In this Example, two experiments were run, one using the present invention and the other using the prior art as shown in U.S. Pat. No. 4,113,687. The purpose of these runs was to show the improved foam properties obtained by the present invention. The recipes, polymerization conditions and properties are shown in the following table:

TABLE III

| Polymerization | No. 11 Invention Parts | No. 12 Prior Art Parts |
|---|---|---|
| Vinyl chloride | 100 | 100 |
| Water (demineralized) | 140 | 112 |
| Sodium lauryl sulfate | 0.9 | — |
| Alcohol ($C_{12} + C_{18}$) | 0.25 | — |
| Dioctyl adipate | 0.25 | — |
| Di (2-ethyl hexyl) peroxydicarbonate | 0.01 | — |
| Dissononanoyl peroxide | 0.03 | — |
| Emulsion[1] | — | 25 |
| Potassium persulfate | — | 0.18 |
| Reaction temperature | 55% | 50% |
| Reaction time (hours) | | 13 |
| % Conversion | | 94 |

[1] The emulsion contained 0.45 part sodium lauryl sulfate; 22.2 parts H$_2$O; 0.33 part hexadicane; and 0.67 part dioctyl phthalate.

Plastisols were made with the resins in order to determine Brookfield viscosity, density, cell structure rating and color rating. The following plastisol recipe was employed and the ingredients mixed in usual manner:

| | No. 11 Parts | No. 12 Parts |
|---|---|---|
| PVC (polyvinyl chloride) | 100 | 100 |
| Dioctyl phthalate | 72 | 79.5 |
| Butyl benzyl phthalate | 25 | 27.5 |
| 50% disperion of azo-bis-formamide in dioctyl phthalate | 6 | 6 |
| Zinc octoate | 3 | 3 |

The plastisol properties are given in the following table:

| | No. 11 | No. 12 |
|---|---|---|
| Brookfield RVF Viscosity (cps) | | |
| Initial $V_2$ | 6000 | 64000 |
| $V_{20}$ | 4600 | 13800 |
| 3 Days $V_2$ | — | 100000 |
| $V_{20}$ | — | 14500 |
| 4 Days $V_2$ | 11000 | — |
| $V_{20}$ | 6100 | — |
| 7 Days $V_2$ | 12000 | 180000 |
| $V_{20}$ | 7100 | 19500 |
| Density (Min. @ °F.) | | |
| 3'/400° F. | 24.25 | 31.7 |
| 3½'/400° F. | 14.24 | 18.9 |
| 4'/400° F. | 13.60 | 16.2 |
| 4½'/400° F. | 14.10 | 15.0 |
| Cell Structure Rating[1] | | |
| 3'/400° F. | 1.0 | 3.0 |
| 3½'/400° F. | 1.0 | 4.0 |
| 4'/400° F. | 1.0 | 5.0 |
| 4½'/400° F. | 2.0 | 5.0 |
| Color Rating[1] | | |
| 3'/400° F. | 0.5 | 3.0 |
| 3½'/400° F. | 0.8 | 2.5 |
| 4'/400° f. | 0.7 | 2.0 |
| 4½'/400° F. | 0.6 | 1.0 |

[1] Visual rating: 0 = Best; 5 = Worst

The above figures point out the enhancement of foam properties of the present plastisols over those of the prior art. The cell structure of the foam is such that the pores therein are smaller and have a much more uniform distribution.

EXAMPLE IV

In this Example, an ethoxylated fatty alcohol was employed and compared to a $C_{12}+C_{18}$ alcohol to show the comparable properties and, as can be seen from the data, improved properties in many respects. The polymerizations were carried out as described in Example I and recipes and conditions, along with properties, are given in the table that follows. The plastisol recipe was the same as set forth for Run 11 in Example III.

TABLE V

| RECIPE | Run No. 13 Parts | 14 Parts |
|---|---|---|
| Vinyl chloride | 100 | 100 |
| Water (demineralized) | 140 | 140 |
| Sodium alpha olefin sulfonate | 0.9 | 0.9 |
| Dioctyl adipate | 0.25 | 0.25 |

TABLE V-continued

| RECIPE | Run No. 13 Parts | 14 Parts |
|---|---|---|
| Alcohol ($C_{12} + C_{18}$) | 0.25 | — |
| Neodol 25-7[1] | | 0.25 |
| Di (2-ethyl hexyl) peroxydicarbonate | 0.04 | 0.04 |
| Dissononanoyl peroxide | 0.05 | 0.05 |
| Reaction Temperature | 45° C. | 45° C. |
| Reaction time (hours) | 14 | 20 |
| % Buildup | 0.33 | 0.21 |
| % Buildup hosed off | 70 | 75 |
| % Coagulum | 0.42 | 0.31 |
| Brookfield Viscosity (cps) | | |
| 1 Day $V_2$ | 115000 | 82500 |
| $V_{20}$ | 30500 | 29500 |
| 7 Days $V_2$ | 220000 | 160000 |
| $V_{20}$ | 46000 | 42500 |

[1] Mixture of ethoxylated linear primary alcohols containing from 1 to 15 carbon atoms (Shell Chemicals, Inc.)

Again the data shows comparable and improved properties.

The many advantages of the present invention are readily ascertainable from the above description and specific examples. The vinyl dispersion resins produced, as defined herein, have improved Brookfield viscosity, Severs efflux, better clarity, as well as improved gel temperature and air release. Further, the bloom and bleed properties are improved with the lower emulsifier levels. A further important advantage of the present invention is improved plastisol foam properties. Also, the lower emulsifier levels provide a considerable savings in the cost of manufacture thus providing a more economical commercial process. Another important factor of the present invention is the reduction in polymer buildup in the reactor which not only reduces costs but results in a better quality product being produced with increased yields. Numerous other advantages of the invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A process of producing polymers of vinyl and vinylidene halides and copolymers thereof with each other or either with one or more polymerizable olefinic monomers having at least one terminal $CH_2{=}C{<}$ group comprising, forming a monomer premix containing the monomer or monomers to be polymerized, the aqueous reaction medium, from about 0.01% to about 0.5% by weight of a water-insoluble, free radical yielding catalyst, based on the weight of 100 parts of monomer or monomers being polymerized, an emulsifier, from about 0.1% to about 1.0% by weight, based on the weight of 100 parts of monomer(s), of a water-insoluble plasticizer, homogenizing said entire premix at a temperature below the reactivity of the catalyst or catalysts employed, polymerizing said homogenized premix in a reaction zone at a temperature in the range of about 30° C. to about 70° C. while maintaining the pH thereof in the range of about 2.0 to about 10.5 until the reaction is complete, and thereafter recovering the polymer or copolymer, and wherein polymer buildup in said reaction zone is substantially reduced.

2. A process as defined in claim 1 wherein the monomers in the premix are vinyl chloride and methyl acrylate.

3. A process of producing polymers of vinyl and vinylidene halides and copolymers thereof with each other or either with one or more polymerizable olefinic monomers having at least one terminal $CH_2{=}C{<}$ group comprising, forming a monomer premix containing the monomer or monomers to be polymerized, the aqueous reaction medium, from about 0.01% to about 0.5% by weight of a water-insoluble, free radical yielding catalyst, based on the weight of 100 parts of monomer or monomers being polymerized, an emulsifier system comprised of from about 0.6% to about 1.2% by weight, based on the weight of 100 parts of monomer(s), of compounds selected from the group consisting of alkali metal or ammonium salts of long chain saturated fatty acids containing from 8 to 20 carbon atoms and alkali metal or ammonium salts of the sulfates of alcohols containing from 8 to 18 carbon atoms, from about 0.1% to about 1.0% by weight, based on the weight of 100 parts of monomer(s), of a water-insoluble plasticizer, homogenizing said entire premix at a temperature below the reactivity of the catalyst or catalysts employed, polymerizing said homogenized premix in a reaction zone at a temperature in the range of about 30° C. to about 70° C. while maintaining the pH thereof in the range of about 2.0 to about 10.5 until the reaction is complete, and thereafter recovering the polymer or copolymer, and wherein polymer buildup in said reaction zone is substantially reduced.

4. A process as defined in claim 3 wherein the monomer in the premix is vinyl chloride.

5. A process as defined in claim 3 wherein the monomers on the premix are vinyl chloride and vinyl acetate.

6. A process as defined in claim 3 wherein the plasticizer is dioctyl phthalate.

7. A process as defined in claim 3 wherein the plasticizer is epoxidized soybean oil.

8. A process as defined in claim 3 wherein the plasticizer is dioctyl adipate.

9. A process as defined in claim 3 wherein the catalyst is bis(4-tert butyl cyclohexyl) peroxydicarbonate.

10. A process as defined in claim 3 wherein the catalysts is di(2-ethyl hexyl) peroxydicarbonate.

11. A process as defined in claim 3 wherein the catalyst is diisononanoyl peroxide.

12. A process as defined in claim 3 wherein the emulsifier system contains at least one long straight chain saturated alcohol containing 12 to 24 carbon atoms and wherein the ratio of alcohol to emulsifier is less than 1.0.

13. A process as defined in claim 12 wherein the emulsifier system contains sodium lauryl sulfate.

14. A process as defined in claim 13 wherein the monomer in the premix is vinyl chloride.

15. A process as defined in claim 12 wherein the emulsifier system contains sodium alpha olefin sulfonate.

16. A process as defined in claim 15 wherein the monomer in the premix is vinyl chloride.

17. A process as defined in claim 16 wherein the pH is in the range of about 5.0 to about 10.5.

18. A process as defined in claim 17 wherein the plasticizer is dioctyl phthalate.

19. A process as defined in claim 18 wherein the catalyst is bis(4-tert butyl cyclohexyl) peroxydicarbonate.

* * * * *